May 23, 1939.　　　　H. D. BOYCOTT　　　　2,159,626

TIRE CHAIN APPLYING DEVICE

Filed March 15, 1938

INVENTOR
Harold D. Boycott
By Green & McCallister
His Attorneys

Patented May 23, 1939

2,159,626

UNITED STATES PATENT OFFICE 2,159,626

TIRE CHAIN APPLYING DEVICE

Harold D. Boycott, Knapps Creek, N. Y.

Application March 15, 1938, Serial No. 195,993

8 Claims. (Cl. 81—15.8)

The present invention relates to a device for facilitating the attachment of anti-skid chains to automotive tires, and more particularly relates to a steel wire device by means of which such chains can be readily applied.

Recent trends in automobile design have had the result that the rear tires of automobiles are so shielded or nearly enclosed by present fender designs as to make it extremely difficult and inconvenient to apply conventional anti-skid chains to such tires. As a result, it has been necessary to remove the shields now so commonly used in connection with rear fenders, or to provide special jacks which make it possible to raise the fender away from the tire in order to apply anti-skid chains. Even under such conditions, tire chains cannot be readily put in place due to the inaccessibility of the tire.

Certain devices have been proposed in the past which are intended to aid this situation but these devices have themselves been subject to a number of defects and disadvantages which have prevented their adoption and use. For example, various forms of U-shaped clamps have been designed but these have been constructed upon the theory that tires are round whereas present-day tires are more nearly hexagonal in cross-section. The tires, therefore, do not fit the clamps which accordingly become distorted when the weight of the automotive vehicle rests thereupon so that they are of no practical use for the purpose intended. In addition, insofar as I am aware, these prior devices are only able to be used in connection with a particular size of tire or a very narrow range of tire sizes and hence have not been able to accommodate the usual range of tire sizes found upon the various cars.

It is, accordingly, one of the objects of the present invention to produce a device which shall be free from the defects and disadvantages of prior devices, which shall be inexpensive to manufacture and which is simple in use and operation.

Another object of the invention resides in producing a device by means of which anti-skid chains can be quickly and conveniently attached to automotive tires, regardless of the fender construction of the particular vehicle and without removing or disassembling any of the parts of the fender construction.

More specifically, an object of this invention is to produce a tire chain attaching device which is made of wire, which will accommodate the full range of tire sizes used upon present-day automobiles and which will enable tire chains to be attached without any difficult or inconvenient manipulations.

Other and further objects and advantages will be understood by those skilled in this art or will be apparent or pointed out hereinafter.

In the accompanying drawing, wherein I have illustrated a preferred form of device embodying the present invention, and wherein like numerals designate corresponding parts throughout the various views.

Figure 1:
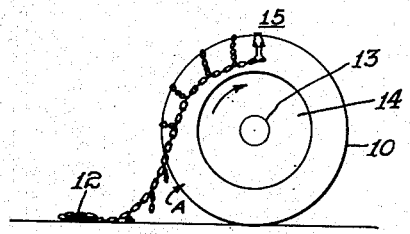
Figure 1 is a side elevational view illustrating the application of a chain to a tire in accordance with this invention.
Figures 2, 3:
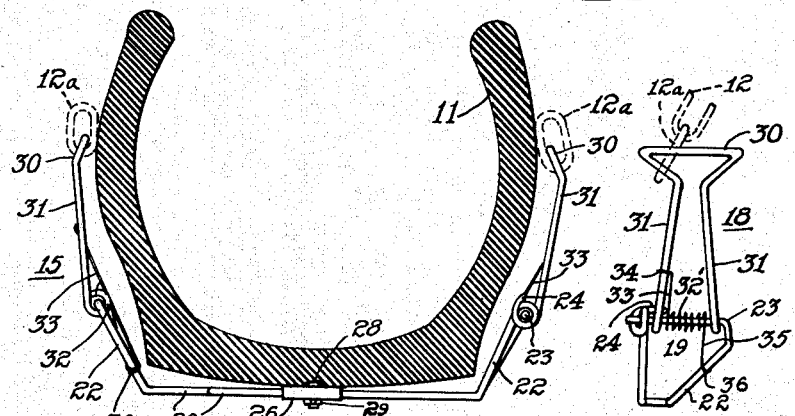
Fig. 2 is a view partly in cross-section and partly in elevation illustrating my new device in association with an automotive tire.
Fig. 3 is a side elevational view of the device illustrated in Fig. 2.

Referring first to the drawing, the numeral 10 designates an automotive tire, the shape of the cross-section 11 of which will be apparent from Fig. 2, from which it appears that the cross-section of a tire under normal inflation conditions approaches a hexagon. The numeral 12 indicates a conventional tire chain which, as shown in Fig. 1, has been partially applied to the tire by means of the present invention. The point indicated by the arrow A in Fig. 1 is the point where my device is first applied to the tire 10 and this point, it will be noted, is readily accessible regardless of the construction or design of the rear fender and regardless of the presence or absence of the so-called "fender shields" which are now commonly used and which frequently extend to a point below the hub cap 13 of the wheel 14.

My device is indicated as a whole by the numeral 15 and is composed of four main parts; namely, the base members 16, the means 17 for securing them together in adjustable relationship, the side arms 18 and the springs 19, forming a combination by means of which the present objects and advantages can be realized.

The base members are composed of lengths of steel wire which are bent into the configuration shown. Each base member has two parallel portions 20 connected by a U-shaped intermediate portion 21. The ends opposite the U-shaped portions 21 of the base members are bent upwardly so that they extend angularly from the parallel portions 20 to form angular portions 22. These angular portions 22 are connected by providing one of the members thereof with a transverse bar-like portion 23 around which near the free end thereof the other member is bent in such a manner as to form a connection between the members while at the same time producing a projecting curved portion 24 which constitutes a latch, the purpose of which will be hereinafter explained.

Figure 4:
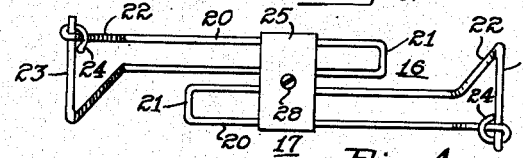
Fig. 4 is a plan view of the base of my new device.
Figures 5, 6:
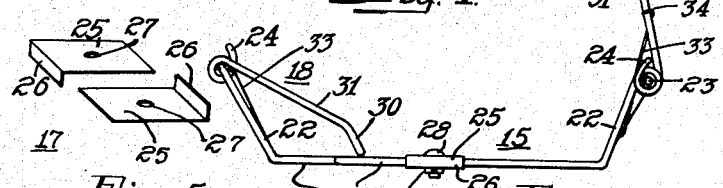
Fig. 5 is an exploded perspective view of the means for clamping the base members of my device together and for adjusting the device to accommodate tires of different sizes.
Fig. 6 is a side elevational view of the device of Fig. 2 but in partially folded or collapsed condition.

The two base members are united in a single plane by two plates 25, each of which consists of a flat rectangular piece of metal terminating in a right angled flange 26. The metal pieces are each provided with a central hole 27. These pieces are assembled with the base members as will be clear from Figs. 2, 4 and 6 in such manner as to clamp the base members together while at the same time permitting adjustment. As will be clear from Figs. 4 and 6 in particular, a screw 28 passes through the holes 27 in the metal pieces 25 and is provided with a nut 29 by means of which the assembly may be tightened. When tightened the base members are maintained securely in a predetermined spaced relationship so as to provide the required distance between the angular portions 22 for the purpose of accommodating a tire of definite size. When the device is to be used with a tire of greater or lesser size, the nut 29 is loosened and the base members so relatively moved longitudinally of each other as to increase or decrease respectively the distance between the angular portions aforesaid and the nut again tightened. In this manner the device is readily employed with a wide range of tire sizes and makes it unnecessary to produce the device in more than one size, thus effecting economies of manufacture and hence reducing the cost of the device.

Connected to the bar-like portions 23 of the base members above described, are the arms 18, the configuration of which is best shown in Fig. 3, from which it will be appreciated that the arms consist of a single length of steel wire bent so as to form an upper triangular portion 30 and the somewhat diverging legs 31 which terminate in eyes 32 within which the portions 23 of the base members are received on which the arms 18 are therefore pivotally mounted. Suitable springs 19 are provided which have body portions 32' coiled around portions 23 of the base members and which has one terminus in the form of an elongated extension 33 terminating in a cross-piece 34 resting against one leg 31 of each of the arms 18 and another elongated extension 35 terminating in a portion 36 which is wrapped around one of the angular portions 22 of the base members.

It will be noted from Fig. 3 in particular that one leg 31 of arm 18 lies behind the latch 24 and since the spring 32 tends to urge the arm normally against the inside of the latch the arm is held firmly in position while the device is in use. The arrangement is such, however, that the device can be collapsed or folded, as will appear clearly from Fig. 6. To accomplish this, the legs 31 of the arm 18 are manually squeezed together until the leg behind latch 24 is disengaged therefrom whereupon the arm 18 can be folded down in the position of Fig. 6 for compactness and convenience in storing, shipping, etc. When squeezing pressure is relieved from legs 31, they again assume normal positioning.

In utilizing the device of my present invention, a link 12a near one end of the tire chain is slipped over one of the acute angled portions of the triangular upper ends 30 of the arms 18 and, the device having previously been adjusted for the particular tire size involved, the device is slipped over the tire at the point A in Fig. 1. It is not necessary that the extreme end links of one end of the chain be attached as described as any links near the end of the chain may be equally well employed. Then the tire is given one substantially complete rotation until the device again reaches approximately the point A. Then the ends of the chain are hooked or locked together in conventional manner and finally the device is removed leaving the tire chain on the tire in its usual position.

I wish to point out further that in applying a tire chain to a tire by means of the present device, it is not necessary to spread out the chain in the usual manner but the chain can merely be dropped in a loose pile adjacent the rear of the tire, the only precaution being required being that there must be no twists in the chain. Due to the fact that the device is flat, no distortion or undesirable disturbance of the various parts occurs and due to the adjustability of the device it can be employed with all ordinary tire sizes. When the weight of the tire rests upon my present device no possible damage to the device can result. The device is made of plain steel wire and returns immediately to its previous condition even if somewhat spread by tires which are under-inflated and hence which are wider than such a tire normally would be under proper conditions of inflation. The spreading action occurring simply forces arms 18 outwardly against the tension of the coil springs. Spring wire may, however, be employed, if desired, for the device.

For a device of this character to be commercially and practically used, it must meet at least four requirements; namely, it must be able to be easily attached to and removed from a tire; it must hold the chain firmly on the tire and be unaffected by improper tire inflation or adverse road conditions; it must be adjustable to fit all ordinary sizes of tires; and it must be of such a nature structurally that it can be applied under low close-fitting fenders even when such fenders are provided with wheel shields. The device of my present invention meets all these requirements and in addition is extremely inexpensive to manufacture while at the same time being especially simple to use. There is no front or back or left or right to the device and hence it need not be placed in any special position for use which is a clear advantage. Likewise, the device is readily removed after the tire chain has been attached and due to the fact that it can be collapsed or folded the device can be stored in a very small space.

The foregoing is intended by me as illustrative and not limitative and within the scope and principles hereof I may make certain variations, modifications, substitutions or omissions such as will best adapt the device for any given conditions. While the device has been particularly described in connection with applying tire chains to automobiles, it is, of course, equally applicable to trucks, buses, tractors and the like and for such use can be made somewhat larger or with a greater adjustment so as to allow for the greater tire sizes used upon such vehicles. Rather, the invention is to be defined by the subjoined claims.

Having thus described my invention, what I claim as new and desire to secure by Letters Patent is:

1. A tire chain attaching device comprising a pair of base members terminating in angular extensions, an arm pivotally secured to each such angular extension, cooperating spring and latch means for maintaining said arms normally in upright position, and means for securing said base members in spaced adjustable relationship.

2. A tire chain attaching device comprising a wire base, angular wire portions extending upwardly from the ends of such base, wire arms pivotally secured to said angular portions, means for maintaining said arms in upright position and for enabling the same to be collapsed, and means for lengthening and shortening said base to accommodate tires of various sizes.

3. A tire chain attaching device comprising a pair of U-shaped flat wire members each of which terminates in an angular extension, arms pivotally secured to said angular extensions and adapted to temporarily hold a tire chain in operative association with a tire, means for maintaining such arms in chain receiving position, and means for adjusting said base members relatively to each other to lengthen and shorten the distance between said angular extensions.

4. A tire chain attaching device comprising a pair of U-shaped steel wire members secured together in planar relationship, an angular extension at the end of each such base member and having a transverse bar member and an associated latch, an arm composed of a single length of wire bent to form a triangular upper portion and diverging leg portions, the termini of which are bent around said bar portions and one of which leg portions contacts said latch, and a spring member having a body portion coiled around said bar portions and having oppositely extending termini engaging one of said leg portions and said angular extension, said first members being so secured that the effective distance between the angular extensions can be increased and diminished to accommodate various tire sizes.

5. A tire chain attaching device comprising a pair of U-shaped wire base members disposed in opposed side by side relationship, angular portions rising from the ends of said base members and bent at their ends to form cross-bars and latches, means securing said base members in predetermined spaced relationship but enabling the distance between said angular portions to be varied to accommodate tires of different sizes, arms pivotally mounted on said cross-bars and spring means for normally urging said arms into upright position against said latches.

6. A tire chain attaching device comprising a pair of U-shaped wire base members disposed in opposed side by side relationship, angular portions rising from the ends of said base members and bent at their ends to form cross-bars and latches, means securing said base members in predetermined spaced relationship but enabling the distance between said angular portions to be varied to accommodate tires of different sizes, arms pivotally mounted on said cross-bars and spring means for normally urging said arms into upright position against said latches, said arms each being constituted of a triangular upper end and a pair of diverging legs the ends of which are bent around the said cross-bars.

7. A tire chain attaching device comprising a pair of U-shaped wire base members disposed in opposed side by side relationship, angular portions rising from the ends of said base members and bent at their ends to form cross-bars and latches, means securing said base members in predetermined spaced relationship but enabling the distance between said angular portions to be varied to accommodate tires of different sizes, arms pivotally mounted on said cross-bars and spring means for normally urging said arms into upright position against said latches, said securing means being constituted of a pair of apertured plates each of which has a marginal flange and a screw and nut assembly passing therethrough.

8. A tire chain attaching device comprising a pair of U-shaped wire base members disposed in opposed side by side relationship, angular portions rising from the ends of said base members and bent at their ends to form cross-bars and latches, means securing said base members in predetermined spaced relationship but enabling the distance between said angular portions to be varied to accommodate tires of different sizes, arms pivotally mounted on said cross-bars and spring means for normally urging said arms into upright position against said latches, each of said arms having diverging legs movable toward each other to effect disengagement from said latches in which condition said arms may be folded down upon said base members.

HAROLD D. BOYCOTT.